United States Patent Office 3,786,094
Patented Jan. 15, 1974

3,786,094
NOVEL PHENYLHYDRAZONES
Jacques Perronnet and Pierre Girault, Paris, France, assignors to Roussel-UCLAF, Paris, France
No Drawing. Filed Sept. 15, 1971, Ser. No. 180,851
Claims priority, application France, Sept. 17, 1970, 7033717
Int. Cl. C07c *123/00*
U.S. Cl. 260—564 R    8 Claims

ABSTRACT OF THE DISCLOSURE

Phenylhydrazones of the formula

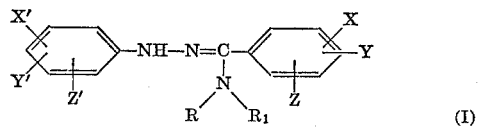

wherein X and Y are selected from the group consisting of hydrogen, chlorine, bromine, lower alkoxy, lower alkyl, $NO_2$ and $CF_3$, Z is selected from the group consisting of hydrogen, chlorine, bromine, lower alkoxy, lower alkyl and $NO_2$, X' is selected from the group consisting of hydrogen, chlorine, bromine, benzyloxy, $NO_2$, SCN, $CF_3$, lower alkyl and lower alkoxy, Y' is selected from the group consisting of hydrogen, chlorine, bromine, —$NO_2$, $CF_3$ and lower alkyl, Z' is selected from the group consisting of hydrogen, chlorine, bromine and lower alkyl, R and $R_1$ may be different and are selected from the group consisting of hydrogen, lower alkyl, benzyl, cycloalkyl of 3 to 8 carbon atoms, furfuryl and aryl optionally substituted with a member of the group consisting of chlorine, bromine and lower alkoxy and taken together with the nitrogen atom to which they are attached form a 5 to 7 ring member heterocyclic with the proviso that at least one of X, Y, Z, R, $R_1$, X', Y' and Z' is other than hydrogen which have remarkable fungicidal activity, their preparation and novel intermediates therefore.

OBJECTS OF THE INVENTION

It is an object of the invention to provide the novel substituted phenylhydrazones of Formula I.

It is another object of the invention to provide a novel process for the preparation of the phenylhydrazones of Formula I and novel intermediates produced thereby.

It is a further object of the invention to provide novel fungicidal compositions.

It is an additional object of the invention to provide a novel method of combatting fungi.

These and other objects and advantage of the invention will become obvious from the following detailed description.

THE INVENTION

The novel phenylhydrazones of the invention have the formula

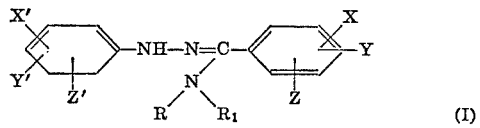

wherein X and Y are selected from the group consisting of hydrogen, chlorine, bromine, lower alkoxy, lower alkyl, $NO_2$ and $CF_3$, Z is selected from the group consisting of hydrogen, chlorine, bromine, lower alkoxy, lower alkyl and $NO_2$, X' is selected from the group consisting of hydrogen, chlorine, bromine, benzyloxy, $NO_2$, SCN, $CF_3$, lower alkyl and lower alkoxy, Y' is selected from the group consisting of hydrogen, chlorine, bromine, —$NO_2$, $CF_3$ and lower alkyl, Z' is selected from the group consisting of hydrogen, chlorine, bromine, and lower alkyl, R and $R_1$ may be different and are selected from the group consisting of hydrogen, lower alkyl, benzyl, cycloalkyl of 3 to 8 carbon atoms, furfuryl and aryl optionally substituted with a member of the group consisting of chlorine, bromine and lower alkoxy and taken together with the nitrogen atom to which they are attached form a 5 to 7 ring member heterocyclic with the proviso that at least one of X, Y, Z, R, $R_1$, X', Y' and Z' is other than hydrogen.

In a preferred group of the novel products, X and X' are chlorine, Y, Y', Z and Z' are either chlorine or hydrogen, R is hydrogen, lower alkyl or cycloalkyl and $R_1$ is lower alkyl or cycloalkyl. Lower is intended to mean 1 to 7 carbon atoms. In a second preferred group of novel products, X, X', Y and Y' are hydrogen, $CF_3$ or chlorine, Z and Z' are hydrogen or chlorine and R and R' are hydrogen, lower alkyl or cycloalkyl, with the proviso that at least one of X, Y, Z, R, $R_1$, X', Y' and Z' are other than hydrogen.

Another preferred group of compounds have substituents where X, Y and Z are hydrogen, chlorine, lower alkyl, lower alkoxy or —$NO_2$, X' is hydrogen, chlorine, benzyloxy, —$NO_2$, —SCN, lower alkyl or lower alkoxy, Y' is hydrogen, chlorine, —$NO_2$ or lower alkyl, Z' is hydrogen, lower alkyl or chlorine and R and $R_1$ are hydrogen, lower alkyl, cycloalkyl, benzyl, furfuryl, or aryl optionally substituted with chlorine or lower alkoxy with the proviso that at least one of X, Y, Z, R, $R_1$, X', Y', and Z' is other than hydrogen.

In fourth preferred group of novel products, X and Y are hydrogen, chlorine, lower alkoxy or —$CF_3$, Z, Y' and Z' are hydrogen or chlorine, X' is hydrogen, —$CF_3$ or chlorine and R and R' together with the nitrogen atom to which they are attached form a heterocyclic.

Among the compounds of Formula I, the most interesting compounds to date have been N-(α-dimethylamino-2',4'-dichlorobenzylidene)-
  4-chloro-phenylhydrazine,
N-[α-(N-methyl-N-cyclohexylamino)-4'-chlorobenzylidene]-4-chlorophenylhydrazine and
N-(α-methylamino-4'-chlorobenzylidene)-4-chlorophenylhydrazine.

The novel process of the invention for the preparation of the phenylhydrazones of Formula I reacting a compound of the formula

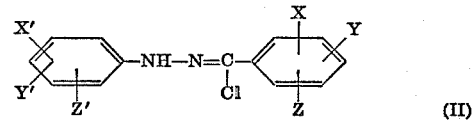

wherein X, Y, Z, X', Y' and Z' have the above definition with an amine of the formula

where R and $R_1$ have the above definitions to form the corresponding phenylhydrazone. The reaction is preferably effected in an organic solvent such as benzene, ethyl ether or tetrahydrofuran.

The starting materials of Formula II can be prepared by reacting in the presence of a tertiary base a phenylhydrazine of the formula

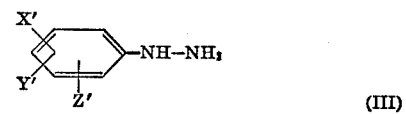

with a benzoyl chloride of the formula

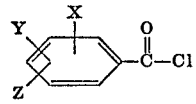

to obtain a benzylhydrazide of the formula

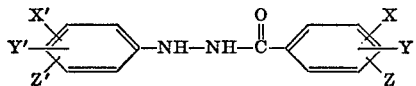

which is treated with a chlorination agent and then a phenol to obtain a compound of Formula II.

The novel fungicidal compositions of the invention are comprised of an effective amount of at least one compound of Formula I and an inert carrier. The compositions may also contain one or more other pesticidal agents. The compositions may be in the form of powders, granules, suspensions, emulsions or solutions containing, for example, other active principles, cationic, nonionic or anionic surface active agents, inert powders such as talc, clay, silicates, kieselguhr, etc., a vehicle such as water, alcohol, hydrocarbons or other organic solvents, animal, vegetable or mineral oils, etc.

An example of a useful fungicidal composition in powder form for foliar spraying consist of 25% by weight of N - ($\alpha$ - diisopropylamino - 4'-chlorobenzylidene)-4-chlorophenylhydrazine, 15% by weight of Ekapersol S (condensation product of sodium naphthalene sulfonate), 0.5% by weight of Brecolane N.V.A. (sodium alkyl naphthalene sulfonate), 34.5% by weight of Zeosil 39 (synthetic hydrated silica) and 25% by weight of Vercoryl S (colloidal kaolin). The powders for foliar spraying preferably contain 25 to 95% by weight of the active ingredient and powders for foliar dusting preferably contain 2.5 to 99% by weight of the active ingredient.

The novel method of combatting fungi comprises contacting fungi with a lethal amount of at least one active compound of Formula I. Tests have shown the products to be effective against Erysiphe polygoni and Fusarium.

In the following examples there are described several preferred embodiments to illustrate the invention. However, it should be understood that the invention is not intended to be limited to the specific embodiments.

STARTING MATERIALS

EXAMPLE A

N-($\alpha$-chloro-4'-chlorobenzylidene)-3,4-dichlorophenylhydrazine

Step A: $\beta$ - (3',4' - dichlorophenyl)-4-chlorobenzhydrazide.—130 g. of 3,4-dichlorophenylhydrazine hydrochloride (the 3,4-dichlorophenylhydrazine is described in Pat. No. 2,863,864) were dissolved at 5° C. in 1300 ml. of pyridine and slowly 107.5 g. of p-chlorobenzoyl chloride (described in Beilstein, vol. 9, p. 341; I, 140 II, 227) were added thereto. The reaction mixture was stirred at room temperature for 17 hours and was then poured into a mixture of water and ice and stirred. The precipitate formed was recovered by vacuum filtration, was washed and dried. The product was purified by crystallization from isopropanol to obtain 94 g. of $\beta$-(3',4'-dichlorophenyl)-4-chlorobenzhydrazide melting at 222° C.

Analysis.—$C_{13}H_9Cl_3N_2O$; molecular weight=315.59. Calculated (percent): C, 49.47; H, 2.87; Cl, 33.71; N, 8.88. Found (percent): C, 49.4; H, 2.9; Cl, 33.4; N, 9.1.

As far as is known, this compound is not described in the literature.

Step B: N-($\alpha$-chloro - 4' - chlorobenzylidene)-3,4-dichloro phenylhydrazine.—55 g. of $\beta$-(3',4'-dichlorophenyl)-4-chlorobenzhydrazide and 55 g. of phosphorus pentachloride in 170 ml. of ethyl ether were refluxed for 1 hour and the mixture was then stirred at room temperature for 48 hours. After cooling to 5° C., 90 g. of phenol and 90 ml. of ethyl ether were slowly added thereto and the mixture was stirred for 30 minutes at room temperature. The mixture was introduced into methanol and the ether was distilled off at atmospheric pressure. The mixture was cooled and the precipitate formed was recovered by vacuum filtration to obtain 45 g. of N-($\alpha$-chloro - 4' - chlorobenzylidene) - 3,4-dichloro-phenylhydrazine melting at 140° C. A sample of the product melted at 140° C. after crystallation form acetonitrile.

Analysis.—$C_{13}H_8Cl_4N_2$; molecular weight=344.04. Calculated (percent): C, 46.74; H, 2.41; Cl, 42.46; N, 8.39. Found (percent): C, 46.7; H, 2.5; Cl, 42.2; N, 8.4.

As far as is known, this compound is not described in the literature.

EXAMPLE B

N-($\alpha$-chloro-2,4-dichlorobenzylidene)-phenylhydrazine

Step A: $\beta$-phenyl-2,4-dichlorobenzhydrazide.—190 g. of 2,4-dichlorobenzoyl chloride (described in Beilstein, vol. 9, p. 342; II, p. 229) were slowly added to 90 g. of phenylhydrazine in 400 ml. of pyridine at 5° C. and the mixture was stirred at room temperature for 17 hours. 20 ml. of water added thereto and the solution was poured into 1500 cc. of water. The precipitate formed was recovered by vacuum filtration, was dried and crystallized from ethanol to obtain 122 g. of $\beta$-phenyl-2,4-dichlorobenzhydrazide melting at 190° C.

As far as is known, this compound is not described in the literature.

Step B: N - ($\alpha$-chloro-2,4-dichlorobenzylidene)-phenylhydrazine.—36 g. of $\beta$-phenyl-2,4-dichloro-benzhydrazide was added to 120 ml. of ethyl ether followed by the addition of 36 g. of phosphorus pentachloride and the mixture was stirred for 2 hours at 20° C. and then 30 minutes at reflux and finally for 15 hours at 20° C. After cooling to 10° C., a solution of 58 g. of phenol in 60 ml. of ethyl ether was slowly added thereto and the mixture was stirred at room temperature for 30 minutes. Methanol was added thereto and the ether was distilled off under atmospheric pressure. After cooling, the precipitate formed was recovered by vacuum filtration, was dried and crystallized from acetonitrile to obtain 23.7 g. of N-($\alpha$-chloro-2,4-dichlorobenzylidene)-phenylhydrazine melting at 85° C. A sample of the product melted at 85° C. after purification by cromatography over silica gel.

Analysis.—$C_{13}H_9Cl_3N_2$; molecular weight=299.59. Calculated (percent): C, 52.11; H, 3.03; Cl, 35.51; N, 9.36. Found (percent): C, 52.3; H, 3.3; Cl, 35.3; N, 9.3.

As far as is known, this compound is not described in the literature.

EXAMPLE C

N-($\alpha$-chloro-4'-methoxybenzylidene)-4-chlorophenylhydrazine

Step A: $\beta$ - (4'-chlorophenyl) - 4 - methoxybenzhydrazide.—57.2 g. of p-chlorophenylhydrazine hydrochloride (the p-chlorophenyl hydrazine is described in Beilstein, vol. 15, p. 425; I, 106; II, 150) and then 68 g. of 4-methoxybenzoyl chloride were added to 500 ml. of pyridine and the mixture was stirred for 16 hours at 20° C. The reaction mixture was then poured into a water-ice mixture and the precipitate formed was recovered by vacuum filtration, was washed, dried and purified by crystallization from ethanol to obtain 46.7 g. of $\beta$-(4'-chlorophenyl)-4-methoxybenzhydrazide melting at 200° C.

Analysis.—$C_{14}H_{13}ClN_2O_2$; molecular weight=276.73. Calculated (percent): C, 60.76; H, 4.73; Cl, 12.81; N, 10.12. Found (percent): C, 60.6; H, 4.6; Cl, 12.5; N, 10.1.

Step B: N-($\alpha$-chloro-4'-methoxybenzylidene)-4-chlorophenylhydrazine.—First, 41 g. of $\beta$-(4'-chlorophenyl)-4-methoxybenzhydrazide and then 52 of phosphorus pentachloride were added to 500 ml. of ethyl ether and the mixture was refluxed for 72 hours and cooled then to 0° C. A solution of 25 g. of phenol in 100 ml. of ethyl ether and then methanol were added to the reaction mixture and the mixture was stirred for 1 hour at 20° C. The ethyl ether was distilled off at atmospheric pressure and the cooled mixture was vacuumed filtered to obtain 25 g. of N-(α-chloro-4'-methoxybenzylidene) - 4 - chlorophenylhydrazine melting at 101° C.

EXAMPLE D

N-(α-chloro-4'-chlorobenzylidene)-2,4,6-trichlorophenyl hydrazine

A current of chlorine was bubbled through a solution of 75 g. of the phenylhydrazone of p-chlorobenzaldehyde (described in Beilstein, vol. 15 II, p. 58) in 1600 ml. of ethyl acetate for 1 hour at 12° C. and the mixture was stirred for 30 minutes and then cooled to 5° C. The precipitate formed was recovered by vacuum filtration, was washed and dried to obtain 46 g. of N-(α-chloro-4'-chlorobenzylidene)-2,4,6-trichlorophenyl hydrazine melting at 128° C. A sample of the product melted at 128° C. after crystallization from acetonitrile.

Analysis.—$C_{13}H_7Cl_5N_2$; molecular weight=368.49. Calculated (percent): C, 42.37; H, 1.91; Cl, 48.11; N, 7.60. Found (percent): C, 42.1; H, 1.7; Cl, 47.8; N, 7.9.

As far as is known, this compound is not described in the literature.

EXAMPLE E

N-(α-chloro-3',4'-dichlorobenzylidene)-2,4,6-trichlorophenylhydrazine

Step A: Phenylhydrazone of 3,4 - dichlorobenzaldehyde.—A solution of 130 g. of phenylhydrazine in 100 ml. of benzene was added to 200 g. of 3,4-dichloro-benzaldehyde in 500 ml. of benzene and the mixture was stirred for 3 hours at room temperature. The precipitate formed was recovered by vacuum filtration, was washed and dried to obtain 261 g. of the phenylhydrazone of 3,4-dichlorobenzaldehyde melting at 146° C. After crystallization from ethanol, the product still melted at 146° C.

Step B: N - (α-chloro-3',4'-dichlorobenzylidene)-2,4,6-trichlorophenylhydrazine.—A current of chlorine was bubbled through a solution of 75 g. of the phenylhydrazone of 3,4-dichlorobenzaldehyde in 1600 ml. of ethyl acetate for 1 hour at 12° C. and the mixture was then stirred for 30 minutes. The precipitate formed was recovered by vacuum filtration, was washed and dried to obtain 90 g. of N - (α-chloro-3',4'-dichlorobenzylidene)-2,4,6 - trichlorophenyldrazine melting at 151° C. A sample of the product melted at 151° C. after crystallization from acetonitrile.

Analysis.—$C_{13}H_6Cl_6N_2$; molecular weight=402.94. Calculated (percent): C, 38.75; H, 1.50; Cl, 52.8; N, 6.95. Found (percent): C, 38.9; H, 1.8; Cl, 52.6; N, 7.1.

As far as is known, this product is not described in the literature.

EXAMPLE F 217 g. of 3-chloro-4-methoxy-benzoic acid [described by Hopkins et al., Can. J. Research, vol. 24B (1946), p. 208] were added to 800 ml. of thionyl chloride and the reaction mixture was refluxed for 4 hours. Excess thionyl chloride was then distilled off under reduced pressure and the residue was dissolved in petroleum ether (boiling point=65–75° C.). The solution was cooled and the precipitate formed was recovered by vacuum filtration and was dried to obtain 162 g. of 3-chloro-4-methoxy benzoyl chloride melting at 54° C.

As far as is known, this compound is not described in the literature.

EXAMPLE G

The product N-(α-chloro-4-chlorobenzylidene)-phenylhydrazine is described by Brough et al., J. Chem. Soc., 1954, p. 4069 and N-(α-chloro-benzylidene)-phenylhydrazine is described by Huisgen et al. Tetrahedron, vol. 17 (1962), p. 3. N-(α-chloro-3-trifluoromethyl benzylidene)-3-chloro-phenyldrazine melting at 58° C. is described by Chattaway et al., Soc., vol. 127 (1925), p. 1687.

EXAMPLE H

Using the procedure of Example A, phosphorus pentachloride and N-(3-trifluoromethyl-phenyl)-benzhydrazide [described by Forbes et al., Tetrahedron, vol. 8 (1960), p. 67] melting at 184° C. were reacted to form N-(α-chloro-benzylidene)-3-tri-trifluoromethyl - phenyl - hydrazine melting at 89° C.

EXAMPLE I

Using the procedure of Example A, phosphorous pentachloride and N-(4-thiocyanatophenyl)-benzhydrazide [described by Kaufmann et al., Arch. Pharm., 1929, p. 192] melting at 162° C. were reacted to form N-(α-chlorobenzylidene)-4-thiocyanato - phenylhydrazine melting at 155° C.

EXAMPLE J

Using the procedure of Example A, 4-chloro-phenylhydrazine hydrochloride and 4-chlorobenzoyl chloride were reacted to form N-(4'-chlorophenyl)-4-chloro-benzhydrazide melting at 186° C. which was then reacted with phosphorus pentachloride to form N-(α-chloro-4'-chloro benzylidene)-4-chloro-penyldrazine melting at 150° C.

EXAMPLE K

Using the procedure of Example A, 2-chloro-phenylhydrazine hydrochloride and 4-chloro-benzoyl chloride were reacted to form N-(2-chlorophenyl)-4-chloro-benzhydrazide melting at 180° C. which was then reacted with phosphorus pentachloride to form N-(α-chloro 4'-chloro-benzylidene)-2-chloro-phenylhydrazine melting at 102° C.

EXAMPLE L

Using the procedure of Example A, 2,4-dichloro-phenylhydrazine hydrochloride and 4-chloro-benzoyl chloride were reacted to form N-(2',4'-dichloro-phenyl)-4-chloro-benzhydrazide melting at 171° C. which was then reacted with phosphorus pentachloride to form N-(α-chloro-4'-chloro-benzylidene)-2,4-dichloro - phenylhydrazine melting at 138° C.

EXAMPLE M

Using the procedure of Example A, 3-trifluoromethylphenylhydrazine and 4-chloro-benzoyl chloride were reacted to form N-(3'-trifluoromethyl - phenyl)-4-chlorobenzhydrazide melting at 193° C. which was then reacted with phosphorus pentachloride to form N-(α-chloro-4'-chloro - benzylidene)-3-trifluoromethyl - phenylhydrazine melting at 89° C.

EXAMPLE N

Using the procedure of Example A, 4-chloro-phenylhydrazine, and 2,4-dichloro-benzoyl chloride were reacted to form N-(4'-chlorophenyl)-2,4-dichloro - benzhydrazide melting at 208° C. which was then reacted with phosphorus pentachloride to form N-(α-chloro-2',4'-dichlorobenzylidene)-4-chloro-phenylhydrazine melting at 114° C.

EXAMPLE O

Using the procedure of Example A, 4-chloro-phenylhydrazine and 3-chloro-4-methoxy benzoyl chloride were reacted to form N-(4'-chloro-phenyl) - 3 - chloro-4-methoxy-benzhydrazide melting at 192° C. which was then reacted with phosphorus pentachloride to form N - (α-chloro-3'-chloro-4'-methoxy - benzylidene) - 4 - chlorophenylhydrazine melting at 120° C.

EXAMPLE P

Using the procedure of Example A, 4-chloro-phenylhydrazine and 3,4,5-trimethoxy-benzoyl chloride were reacted to form N-(4'-chloro-phenyl) - 3,4,5 - trimethoxybenzhydrazide melting at 197° C. which was then reacted with phosphorus pentachloride to form N-(α-chloro-3',4', 5'-trimethoxy-benzylidene) - 4 - chloro-phenylhydrazine melting at 120° C.

EXAMPLE Q

Using the procedure of Example A, 3,4-dichloro-phenylhydrazine hydrochloride and 3,5-dimethyl-benzoyl chloride were reacted to form N-(3',4'-dichlorophenyl)-3,5-dimethyl-benzhydrazide melting at 204° C. which was then reacted with phosphorus pentachloride to form N-(α-chloro-3',5'-dimethylbenzylidene)-3,4-dichloro phenylhydrazine melting at 94° C.

EXAMPLE R

Using the procedure of Example A, 3,4-dichloro-phenylhydrazine hydrochloride and 3,4-dichloro-benzoyl chloride were reacted to form N-(3',4'-dichlorophenyl)-3,4-dichloro-benzhydrazide melting at 200° C. [described by Yoshiro Usui et al., Matsumumra Yaku Gaku Zasshi, vol. 87 (1967), p. 43] which was then reacted with phosphorus pentachloride to form N-(α-chloro-3',4'-dichloro-benzylidene) - 3,4 - dichloro-phenylhydrazine melting at 180° C.

EXAMPLE S

Using the procedure of Example A, 2,4,6 - trichlorophenylhydrazine hydrochloride and 3,4,5-trimethoxy-benzoyl chloride were reacted to form N-(2',4',6'-trichlorophenyl)-3,4,5-trimethoxy benzhydrazide melting at 204° C. which was then reacted with phosphorus pentachloride to form N-(α-chloro-3',4',5'-trimethoxy-benzylidene) - 2,4,6-trichloro-phenylhydrazine melting at 141° C.

EXAMPLE T

Using the procedure of Example A, 2,4-dichloro phenylhydrazine hydrochloride and 2,4-dichlorobenzoyl chloride were reacted to form N-(2',4'-dichloro-phenyl)-2,4-dichloro-benzhydrazide melting at 168° C. which was then reacted with phosphorus pentachloride to form N - (α-chloro-2',4'-dichlorobenzylidene)-2,4-dichloro - phenylhydrazine melting at 125° C.

EXAMPLE U

Using the procedure of Example A, phenylhydrazine and 3,4-dichloro-benzoyl chloride were reacted to form N - (phenyl)-3,4-dichloro-benzhydrazide melting at 175° C. [described by Stage et al., N.J. Mosquito Exterm. Assoc., 39th meeting (1952) p. 131] which was then reacted with phosphorus pentachloride to form N-(α-chloro-3',4'-dichloro-benzylidene) - phenylhydrazine melting at 125° C.

EXAMPLE V

Using the procedure of Example A, phenylhydrazine and 3-trifluoromethyl benzoyl fluoride were reacted to form N(-phenyl)-3-trifluoromethyl benzhydrazide melting at 120° C. which was then reacted with phosphorus pentachloride to form N-(α-chloro-3-trifluoromethyl - benzylidene)phenylhydrazine melting at 58° C.

EXAMPLE W

Using the procedure of Example A, 4-chloro-phenylhydrazine and 2-chloro-benzoyl chloride were reacted to form N-(4'-chloro-phenyl)-2-chloro-benzhydrazide melting at 191° C. described in U.S. Pat. No. 2,758,054 which was then reacted with phosphorus pentachloride to form N - (α - chloro - 2' - chlorobenzylidene) - 4 - chloro-phenylhydrazine melting at 54° C.

EXAMPLE X

Using the procedure of Example A, 4-methyl-phenylhydrazine sulfate and 4-chloro-benzoyl chloride were reacted to form N-(4'-methyl phenyl)-4-chloro-benzhydrazide melting at 209° C. described in U.S. Pat. No. 2,758,054 which was then reacted with phosphorus pentachloride to form N-(α-chloro-4'-chloro-benzylidene)-4-methyl phenylhydrazine melting at 134° C.

EXAMPLE Y

Using the procedure of Example A, 2,6-dichloro-4-nitrophenylhydrazine hydrochloride and 4-chloro-benzoyl chloride were reacted to form N-(2',6'-chloro-4'-nitrophenyl)-4-chlorobenzhydrazide melting at 200° C. which was then reacted with phosphorus pentachloride to form N - (α - chloro - 4' - chloro-benzylidene) - 2,6 - dichloro-4-nitro-phenylhydrazine melting at 168° C.

EXAMPLE Z

Using the procedure of Example A, 2-methyl-4-chlorophenylhydrazine hydrochloride and 4-chloro-benzoyl chloride were reacted to form N-(2'-methyl-4'-chloro-phenyl)-4-chloro-benzhydrazide melting at 165° C. which was then reacted with phosphorus pentachloride to form N-(α - chloro - 4' - chloro - benzylidene) - 2 - methyl - 4-chloro-phenylhydrazine melting at 123° C.

EXAMPLE AA

Using the procedure of Example A, 3-chloro-4-methoxy-phenylhydrazine hydrochloride and 4-chloro-benzoyl chloride were reacted to form N-(3'-chloro-4'-methoxyphenyl)-4-chloro-benzhydrazide melting at 169° C. which was then reacted with phosphorus pentachloride to form N - (α - chloro - 4' - chloro - benzylidene) - 3 - chloro - 4-methoxy-phenylhydrazine melting at 119° C.

EXAMPLE BB

Using the procedure of Example A, 3-chloro-4-methylphenylhydrazine hydrochloride and 4-chloro-benzoyl chloride were reacted to form N-(3'-chloro-4'-methyl-phenyl)-4-chloro-benzhydrazide melting at 200° C. which was then reacted with phosphorus pentachloride to form N-α-chloro - benzylidene) - 3 - chloro - 4 - methyl - phenylhydrazine melting at 111° C.

EXAMPLE CC

Using the procedure of Example A, 4-benzyloxy-phenylhydrazine hydrochloride and 4-chloro-benzoyl chloride were reacted to form N-(4'-benzyloxy-phenyl)-4-chlorobenzhydrazide melting at 174° C. which was then reacted with phosphorus pentachloride to form N-(α-chloro-4'-chloro-benzylidene)-4-benzyloxy-phenylhydrazine melting at 110° C.

EXAMPLE DD

Using the procedure of Example A, phenylhydrazine and 3-chloro-4-methoxy-benzoyl chloride were reacted to form N - (phenyl) - 3' - chloro-4'-methoxy-benzhydrazide melting at 198° C. which was then reacted with phosphorus pentachloride to form N-(α-chloro-3'-chloro-4'-methoxy-benzylidene)-phenylhydrazine melting at 74° C.

EXAMPLE EE

Using the procedure of Example A, N-(4'-chlorophenyl)-4-nitro-benzhydrazide melting at 214° C. [described by Kenky, Usho Nempo, vol. 4 (1956), p. 265] was reacted with phosphorus pentachloride and phosphorus oxychloride to form N-(α-chloro-4'-nitro-benzylidene)-4-chloro-phenylhydrazine melting at 217° C. [described by Chattaway et al., Soc., vol. 127 (1925), p. 1687]. Also described in the said reference is N-(α-chloro - 3' - trifluromethyl - benzylidene) - 4 - chloro - phenylhydrazine melting at 58° C.

EXAMPLE FF

Using the procedure of Example A, 4-chloro-phenylhydrazine hydrochloride and 4-methoxy-benzoyl chloride were reacted to form N-(4'-chloro-phenyl)-4-methoxybenzhydrazide melting at 200° C. which was then reacted with phosphorus pentachloride to form N-(α-chloro-4'-methoxy-benzylidene)-4-chloro-phenylhydrazine melting at 101° C.

EXAMPLE GG

Using the procedure of Example A, 4-chloro-phenylhydrazine and 3,4-dichloro-benzoyl chloride were reacted to form N-(4'-chloro phenyl)-3,4-dichloro-benzhydrazide melting at 165° C. which was then reacted with phosphorus pentachloride to form N-(α-chloro-3',4'-dichlorobenzylidene) - 4 - chloro - phenyl - hydrazine melting at 138° C.

EXAMPLE HH

Using the procedure of Example A, 4-chloro-phenylhydrazine hydrochloride and 3-trifluoromethyl benzoyl chloride were reacted to form N-(4'-chloro-phenyl)-3-trifluoromethyl-benzhydrazide melting at 148° C. which was then reacted with phosphorus pentachloride to form N-(α - chloro - 3' - trifluoromethyl - benzylidene) - 4-chlorophenylhydrazine melting at 58° C.

EXAMPLE II

Using the procedure of Example A, 3-trifluoromethylphenylhydrazine and 4-chloro-benzoyl chloride were reacted to form N-(3'-trifluoromethyl-phenyl)-4-chlorobenzhydrazide melting at 193° C. which was then reacted with phosphorus pentachloride to form N-(α-chloro-4'-chloro - benzylidene) - 3 - trifluoromethyl - phenylhydrazine melting at 89° C.

EXAMPLE JJ

Using the procedure of Example A, 3-trifluoromethylphenylhydrazine and 2-chloro benzoyl chloride were reacted to form N-(3'-trifluoromethyl-phenyl)-2-chlorobenzhydrazide melting at 144° C. which was then reacted with phosphorus pentachloride to form N-(α-chloro-2'-chloro - benzylidene) - 3 - trifluoromethyl - phenylhydrazine having a refractive index $n_D^{23}$=1.5220.

EXAMPLE KK

Using the procedure of Example A, 3-trifluoromethylphenylhydrazine and 3-trifluoromethyl-benzoyl fluoride were reacted to form N-(3'-trifluoromethyl-phenyl)-3-trifluoromethylbenzhydrazide melting at 153° C. which was then reacted with phosphorus pentachloride to form N-(α-chloro - 3' - trifluromethyl-benzylidene)-3-trifluoromethyl-phenylhydrazine melting at 85° C.

EXAMPLE I

N-(α-dimethylaminobenzylidene)-4-nitrophenylhydrazine

A soultion of 3.5 g. of N - (α - chloro-benzylidene)-4-nitrophenylhydrazine [described by Huisgen et al. Ber. vol. 97 (1964), p. 1085] in 100 ml. of tetrahydrofuran was added slowly to a solution of 3.5 g. of dimethylamine in 50 ml. of tetrahydrofuran and the mixture was stirred for 3 hours at 20° C. The dimethylamine hydrochloride formed was removed by filtration and the filtrate was concentrated to dryness under reduced pressure. The residue was added to isopropyl ether and the precpitate was recovered by vacuum filtration and was dried to obtain 2.5 g. of N - (α - dimethylamino-benzylidene)-4-nitro-phenylhydrazine melting at 98° C. A sample of the product melted at 98° C. after crystallization from isopropyl ether.

Analysis.—$C_{15}H_{16}N_4O_2$; molecular weight=284.31. Calculated (percent): C, 63.36; H, 5.67; N, 19.71. Found (percent): C, 63.4; H, 5.6; N, 19.5.

As far as is known, this product is not described in the literature.

EXAMPLE II

N-(α-dimethylamino-4'-chlorobenzylidene)-3,4-dichlorophenylhydrazine

A solution of 19.2 g. of dimethylamine in 84 ml. of benzene was slowly added at 8° C. to a mixture of 66 g. of N-(α-chloro-4' - chlorobenzylidene) - 3,4 - dichlorophenylhydrazine and 660 ml. of benzene and the mixture was stirred for 4 hours at 20° C. The dimethylamine hydrochloride formed was removed by filtration and the filtrate was concentrated to dryness under reduced pressure. The residue was taken up in methanol and the solution was iced, filtered, vacuum filtered and the precipitate was dried to obtain 61 g. of N - (α - dimethylamino-4'-chloro-benzylidene) - 3,4 - dichloro - phenylhydrazine melting at 71° C. A sample of the product after crystallization from methanol melted at 86° C.

Analysis.—$C_{15}H_{14}Cl_3N_3$; molecular weight=342.65. Calculated (percent): C, 52.57; H, 4.12; N, 12.26; Cl, 31.04. Found (percent): C, 52.7; H, 4.2; N, 12.4; Cl, 30.9.

As far as is known, this product is not described in the literature.

EXAMPLE III

N-(α-aminobenzylidene)-4-chloro-phenylhydrazine

A current of ammonia was bubbled through a solution of 90 g. of N-(α-chloro-benzylidene)-4-chlorophenylhydrazine [described by Huisgen et al., Monatsh, vol. 98 (1967), p. 1618] in 1500 ml. of benzene for 4 hours at 5° C. and the ammonium chloride formed was removed by filtration. The filtrate was concentrated to dryness under reduced pressure and the residue was chromatographed over silica gel with a mixture of benzene-ethyl acetate (7:3) as eluant to obtain 32 g. of N-(α-amino-benzylidene)-4-chloro-phenylhydrazine melting at 104° C. A sample of the product melted at 104° C. after crystallization from petroleum ether (B.P.=65–75° C.).

Analysis.—$C_{13}H_{12}ClN_3$; molecular weight=245.71. Calculated (percent): C, 63.55; H, 4.93; Cl, 14.43; N, 17.10. Found (percent): C, 63.7; H, 4.7; Cl, 14.3; N, 17.0.

As far as is known, this product is not described in the literature.

EXAMPLE IV

N-(α-morpholinyl-2',4'-dichlorobenzylidene) phenylhydrazine 50 g. of morpholine was slowly added at 5° C. to a solution of 75 g. of N-(α-chloro-2',4'-dichlorobenzylidene)-phenylhydrazine in 750 ml. of ethyl ether and the mixture was stirred for 4 hours at 20° C. The insolubles were removed by filtration and the filtrate was evaporated to dryness under reduced pressure. The residue was added to petroleum ether (B.P.=60–80°) and the mixture was vacuum filtered. The precipitate was washed with methanol and then isopropyl ether and dried to obtain 41 g. of N-(α-morpholinyl - 2',4' - dichlorobenzylidene)-phenylhydrazine melting at 100° C. A sample of the product melted at 100° C. after crystallization from isopropyl ether and then methanol.

Analysis.—$C_{17}H_{17}Cl_2N_3O$; molecular weight=350.24. Calculated (percent): C, 58.30; H, 4.89; Cl, 20.24; N, 11.9. Found (percent): C, 58.2; H, 4.9; Cl, 20.2; N, 11.9.

As far as is known, this product is not described in the literature.

EXAMPLE V

N-(α-diisopropylamino-4'-methoxy-benzylidene)-4-chlorophenylhydrazine 19.2 g. of diisopropylamine were slowly added to a solution of 24 g. of N - (α - chloro-4'-methoxy-benzylidene)-4-chloro-phenylhydrazine in 400 cc. of ethyl ether and the mixture was stirred for 4 hours at 20° C. The diisopropylamine hydrochloride formed was removed by filtration and the filtrate was concentrated to dryness under reduced pressure. The residue was chromatographed over silica gel and eluted with a benzene-ethyl acetate (9–1) mixture. The solid was washed with petroleum ether (B.P.=65–75° C.) to obtain 18.4 g. of N-(α-diisopropylamino-4'-methoxy-benzylidene) - 4 - chloro - phenylhydrazine melting at 136° C.

Analysis.—$C_{20}H_{26}ClN_3O$; molecular weight=359.89. Calculated (percent): C, 66.74; H, 7.28; Cl, 9.85; N, 11.67. Found (percent): C, 66.7; H, 7.5; Cl, 10.0; N, 11.6.

As far as is known, this compound is not described in the literature.

EXAMPLE VI

Using the procedure of Example I, N-(α-chloro-benzylidene) - 4 - chloro-phenylhydrazine was recated with dimethylamine to obtain N - (α - dimethylamino-benzylidene) - 4 - chloro-phenylhydrazine melting at 84° C.

As far as is known, this compound is not described in the literature.

EXAMPLE VII

Using the procedure of Example I, N-(α-chloro-benzylidene)-2,4,6-trichloro-phenylhydrazine was reacted with dimethylamine to obtain N - (α - dimethylamino-benzylidene) - 2,4,6 - trichloro - phenylhydrazine melting at 52° C.

As far as is known, this compound is not described in the literature.

EXAMPLE VIII

Using the procedure of Example I, N-(α-chloro-benzylidene)-3-trifluoromethyl-phenylhydrazine was reacted with dimethylamine to obtain N-(α - dimethylamino - benzylidene)-3-trifluoromethyl-phenylhydrazine having a boiling point of 150° C. at 0.8 mm. Hg and a refractive index $n_D^{20} = 1.5734$.

As far as is known, this compound is not described in the literature.

EXAMPLE IX

Using the procedure of Example I, N-(α-chloro-benzylidene)-4-thiocyanato phenylhydrazine was reacted with dimethylamine to obtain N-(α-dimethylaminobenzylidene)-4-thiocyanato-phenylhydrazine melting at 62° C.

As far as is known, this compound is not described in the literature.

EXAMPLE X

Using the procedure of Example I, N-(α-chloro - 4'-chlorobenzylidene)-phenylhydrazine was reacted with dimethylamine to obtain N-(α - dimethylamino-4'-chloro-benzylidene)-phenylhydrazine melting at 131° C.

As far as is known, this compound is not described in the literature.

EXAMPLE XI

Using the procedure of Example I, N-(α - chloro - 4'-chloro-benzylidene)-4-chloro-phenylhydrazine was reacted with dimethylamine to obtain N - (α - dimethylamino-4'-chloro-benzylidene)-4-chloro-phenylhydrazine melting at 110° C.

As far as is known, this compound is not described in the literature.

EXAMPLE XII

Using the procedure of Example I, N - (α - chloro-4'-chloro-benzylidene) - 2 - chloro-phenylhydrazine was reacted with dimethylamine to obtain N-(α-dimethylamino-4' - chloro-benzylidene) - 2 - chloro - phenylhydrazine melting at 86° C.

As far as is known, this compound is not described in the literature.

EXAMPLE XIII

Using the procedure of Example I, N - (α - chloro-4'-chloro-benzylidene) - 2,4 - dichloro-phenylhydrazine was reacted with dimethylamine to obtain N - (α - dimethylamino-4'-chloro-benzylidene) - 2,4 - dichloro - phenylhydrazine melting at 90° C.

As far as is known, this compound is not described in the literature.

EXAMPLE XIV

Using the procedure of Example I, N - (α - chloro - 4'-chloro-benzylidene) - 3 - trifluoromethyl-phenylhydrazine was reacted with dimethylamine to obtain N-(α-dimethylamino-4'-chloro-benzylidene) - 3 - trifluoromethyl-phenylhydrazine melting at 61° C.

As far as is known, this compound is not described in the literature.

EXAMPLE XV

Using the procedure of Example I, N - (α - chloro - 4'-chloro-benzylidene)-4-methyl - phenylhydrazine was reacted with dimethylamine to obtain N - (α - dimethylamino-4'-chloro - benzylidene) - 4 - methyl-phenylhydrazine melting at 96° C.

As far as is known, this compound is not described in the literature.

EXAMPLE XVI

Using the procedure of Example I, N - (α - chloro - 4'-chloro-benzylidene) - 2,6 - dichloro - 4 - nitro-phenylhydrazine was reacted with dimethylamine to obtain N - (α-dimethylamino-4'-chloro - benzylidene) - 2,6 - dichloro-4-nitro-phenylhydrazine melting at 152° C.

As far as is known, this compound is not described in the literature.

EXAMPLE XVII

Using the procedure of Example I, N - (α - chloro - 4'-chloro-benzylidene) - 2 - methyl - 4 - chloro - phenylhydrazine was reacted with dimethylamine to obtain N-(α-dimethylamino-4'-chloro - benzylidene) - 2 - methyl - 4-chloro-phenylhydrazine melting at 140° C.

As far as is known, this compound is not described in the literature.

EXAMPLE XVIII

Using the procedure of Example I, N - (α - chloro - 4'-chloro-benzylidene) - 3 - chloro - 4 - methoxy-phenylhydrazine was reacted with dimethylamine to obtain N-(α-dimethylamino - 4' - chloro-benzylidene) - 3 - chloro-4-methoxy-phenylhydrazine melting at 128° C.

As far as is known, this compound is not described in the literature.

EXAMPLE XIX

Using the procedure of Example I, N - (α - chloro - 4'-chloro-benzylidene) - 3 - chloro - 4 - methyl-phenylhydrazine was reacted with dimethylamine to obtain N-(α-dimethylamino-4'-chloro - benzylidene) - 3 - chloro-4-methyl-phenylhydrazine melting at 95° C.

As far as is known, this compound is not described in the literature.

EXAMPLE XX

Using the procedure of Example I, N - (α - chloro - 4'-chloro - benzylidene) - 4 - benzyloxy-phenylhydrazine was reacted with dimethylamine to obtain N-(α-dimethylamino-4'-chloro-benzylidene) - 4 - benzyloxy-phenylhydrazine melting at 126° C.

As far as is known, this compound is not described in the literature.

EXAMPLE XXI

Using the procedure of Example I, N - (α - chloro - 3', 4'-dichloro - benzylidene) - phenylhydrazine was reacted with dimethylamine to obtain N-(α-dimethylamino-3',4'-dichloro-benzylidene)-phenylhydrazine melting at 100° C.

As far as is known, this compound is not described in the literature.

EXAMPLE XXII

Using the procedure of Example I, N - (α - chloro - 3'-chloro-4'-methoxy - benzylidene) - phenylhydrazine was reacted with dimethylamine to obtain N-(α-dimethylamino - 3' - chloro - 4' - methoxy-benzylidene)-phenylhydrazine melting at 140° C.

As far as is known, this compound is not described in the literature.

EXAMPLE XXIII

Using the procedure of Example I, N-(α-chloro-4'-nitrobenzylidene)-4-chloro-phenylhydrazine was reacted with dimethylamine to obtain N-(α-dimethylamino-4'-nitro-benzylidene) - 4 - chloro-phenylhydrazine melting at 110° C.

As far as is known, this compound is not described in the literature.

EXAMPLE XXIV

Using the procedure of Example I, N-(α-chloro-4'-methoxy-benzylidene) - 4 - chloro-phenylhydrazine was reacted with dimethylamine to obtain N-(α-dimethylamino - 4' - methoxy-benzylidene)-4-chloro-phenylhydrazine melting at 128° C.

As far as is known, this compound is not described in the literature.

EXAMPLE XXV

Using the procedure of Example I, N-(α-chloro-4'-methyl-benzylidene) - 4 - chloro-phenylhydrazine was reacted with dimethylamine to obtain N-(α-dimethylamino-4'-methyl-benzylidene) - 4 - chloro-phenylhydrazine melting at 72° C.

As far as is known, this compound is not described in the literature.

EXAMPLE XXVI

Using the procedure of Example I, N-(α-chloro-3',4'-dichloro-benzylidene) -4 - chloro-phenylhydrazine was reacted with dimethylamine to obtain N-(α-dimethylamino-3',4'-dichloro-benzylidene) - 4 - chloro-phenylhydrazine melting at 142° C.

As far as is known, this compound is not described in the literature.

EXAMPLE XXVII

Using the procedure of Example I, N-(α-chloro-2',4'-dichloro-benzylidene) - 4 - chloro-phenylhydrazine was reacted with dimethylamine to obtain N-(α-dimethylamino-2',4'-dichloro-benzylidene) - 4 - chloro-phenylhydrazine melting at 132° C.

As far as is known, this compound is not described in the literature.

EXAMPLE XXVIII

Using the procedure of Example I, N-(α-chloro-3'-chloro-4'-methoxy-benzylidene) - 4 - chloro-phenylhydrazine was reacted with dimethylamine to obtain N-(α-dimethylamino - 3' - chloro - 4' - methoxy-benzylidene)-4-chloro-phenylhydrazine melting at 154° C.

As far as is known, this compound is not described in the literature.

EXAMPLE XXIX

Using the procedure of Example I, N-(α-chloro-3',4',5'-trimethoxy-benzylidene) - 4 - chloro-phenylhydrazine was reacted with dimethylamine to obtain N-(α-dimethylamino - 3',4',5' - trimethoxy-benzylidene)-4-chloro-phenylhydrazine melting at 120° C.

As far as is known, this compound is not described in the literature.

EXAMPLE XXX

Using the procedure of Example I, N-(α-chloro-3',5'-dimethyl-benzylidene) - 3,4 - dichloro-phenylhydrazine was reacted with dimethylamine to obtain N-(α-dimethylamino - 3',5' - dimethyl-benzylidene)-3,4-dichloro-phenylhydrazine melting at 102° C.

As far as is known, this compound is not described in the literature.

EXAMPLE XXXI

Using the procedure of Example I, N-(α-chloro-3',4'-dichloro-benzylidene) - 3,4 - dichloro-phenylhydrazine was reacted with dimethylamine to obtain N-(α-dimethylamino - 3',4' - dichloro-benzylidene)-3,4-dichloro-phenylhydrazine melting at 115° C.

As far as is known, this compound is not described in the literature.

EXAMPLE XXXII

Using the procedure of Example I, N-(α-chloro-3',4'-dichloro-benzylidene) - 2,4,6 - trichloro-phenylhydrazine was reacted with dimethylamine to obtain N-(α-dimethylamine - 3',4' - dichloro-benzylidene)-2,4,6-trichloro-phenylhydrazine melting at 77° C.

As far as is known, this compound is not described in the literature.

EXAMPLE XXXIII

Using the procedure of Example I, N-(α-chloro-3',4',5'-trimethoxy-benzylidene) - 2,4,6 - trichloro-phenylhydrazine was reacted with dimethylamine to obtain N-(α-dimethylamino - 3',4',5' - trimethoxy-benzylidene)-2,4,6-trichloro-phenylhydrazine melting at 136° C.

As far as is known, this compound is not described in the literature.

EXAMPLE XXXIV

Using the procedure of Example I, N-(α-chloro-benzylidene)-4-chloro-phenylhydrazine was reacted with methylamine to obtain N-(α-methylamino-benzylidene)-4-chloro-phenylhydrazine melting at 144° C.

As far as is known, this compound is not described in the literature.

EXAMPLE XXXV

Using the procedure of Example I, N-(α-chloro-benzylidene)-4-chloro-phenylhydrazine was reacted with piperidine to obtain N-(α-piperidino-benzylidene)-4-chloro-phenylhydrazine melting at 100° C.

As far as is known, this compound is not described in the literature.

EXAMPLE XXXVI

Using the procedure of Example I, N-(α-chloro-benzylidene)-4-chloro-phenylhydrazine was reacted with morpholine to obtain N-(α-morpholino-benzylidene)-4-chloro-phenylhydrazine melting at 142° C.

As far as is known, this compound is not described in the literature.

EXAMPLE XXXVII

Using the procedure of Example I, N-(α-chloro-benzylidene)-4-chloro-phenylhydrazine was reacted with diisopropylamine to obtain N-(α-diisopropylamino-benzylidene)-4-chloro-phenylhydrazine melting at 94° C.

As far as is known, this compound is not described in the literature.

EXAMPLE XXXVIII

Using the procedure of Example I, N-(α-chloro-benzylidene)-4-chloro-phenylhydrazine was reacted with N-methylpiperazine to obtain N-[α-(N-methyl-piperazinyl)-benzylidene]-4-chloro-phenylhydrazine melting at 144° C.

As far as is known, this compound is not described in the literature.

EXAMPLE XXXIX

Using the procedure of Example I, N-(α-chloro-benzylidene)-4-chloro-phenylhydrazine was reacted with N-cyclohexylmethylamine to obtain N-[α-(N-methyl-N-cyclohexylamine) benzylidene]-4-chloro-phenylhydrazine melting at 85° C.

As far as is known, this compound is not described in the literature.

EXAMPLE XL

Using the procedure of Example I, N-(α-chloro-4'-chloro - benzylidene) - 4-chloro-phenylhydrazine was reacted with diethylamine to obtain N-(α-diethylamino-4'-chloro-benzylidene)-4-chloro-phenylhydrazine melting at 96° C.

As far as is known, this compound is not described in the literature.

EXAMPLE XLI

Using the procedure of Example I, N-(α-chloro-4'-chloro - benzylidene) - 4-chloro-phenylhydrazine was reacted with diisopropylamine to obtain N-(α-diisopropylamino-4'-chloro-benzyllidene)-4-chloro - phenylhydrazine melting at 122° C.

As far as is known, this compound is not described in the literature.

EXAMPLE XLII

Using the procedure of Example I, N-(α-chloro-4'-chloro - benzylidene) - 4-chloro-phenylhydrazine was reacted with piperidine to obtain N-(α-piperidyl-4'-chloro-benzylidene)-4-chloro-phenylhydrazine melting at 100° C.

As far as is known, this compound is not described in the literature.

EXAMPLE XLIII

Using the procedure of Example I, N-(α-chloro-4'-chloro - benzylidene) - 4-chloro-phenylhydrazine was reacted with morpholine to obtain N-(α-morpholino-4'-chloro-benzylidene)-4-chloro-phenylhydrazine melting at 157° C.

As far as is known, this compound is not described in the literature.

EXAMPLE XLIV

Using the procedure of Example I, N-(α-chloro-4'-chloro - benzylidene) - 4-chloro-phenylhydrazine was reacted with methylamine to obtain N-(α-methylamino-4'-chloro-benzylidene)-4-chloro-phenylhydrazine melting at 103° C.

As far as is known, this compound is not described in the literature.

EXAMPLE XLV

Using the procedure of Example I, N-(α-chloro-4'-chloro - benzylidene) - 4-chloro-phenylhydrazine was reacted with 4-methoxy-aniline to obtain N-(α-p-methoxy-anilino-4'-chloro-benzylidene)-4-chloro - phenylhydrazine melting at 186° C.

As far as is known, this compound is not described in the literature.

EXAMPLE XLVI

Using the procedure of Example I, N-(α-chloro-4'-chloro - benzylidene) - 4-chloro-phenylhydrazine was reacted with N-methyl-piperazine to obtain N-[α-N-methyl-piperazinyl) - 4' - chloro-benzylidene]-4-chloro-phenylhydrazine melting at 150° C.

As far as is known, this compound is not described in the literature.

EXAMPLE XLVII

Using the procedure of Example I, N-(α-chloro-4'-chloro - benzylidene) - 4-chloro-phenylhydrazine was reacted with furfurylamine to obtain N-(α-furfurylamino-4' - chloro-benzylidene)-4-chloro-phenylhydrazine melting at 114° C.

As far as is known, this compound is not described in the literature.

EXAMPLE XLVIII

Using the procedure of Example I, N-(α-chloro-4'-methoxy - benzylidene) - 4-chloro-phenylhydrazine was reacted with ammonia to obtain N-(α-amino-4'-methoxy-benzylidene)-4-chloro-phenylhydrazine melting at 130° C.

As far as is known, this compound is not described in the literature.

EXAMPLE XLIX

Using the procedure of Example I, N-(α-chloro-3',4'-dichloro-benzylidene)-phenylhydrazine was reacted with ammonia to obtain N-(α-amino-3',4'-dichloro-benzylidene)-phenylhydrazine melting at 168° C.

As far as is known, this compound is not described in the literature.

EXAMPLE L

Using the procedure of Example I, N-(α-chloro-benzylidene)-phenylhydrazine was reacted with morpholine to obtain N - (α-morpholino-benzylidene)-phenylhydrazine melting at 136° C.

As far as is known, this compound is not described in the literature.

EXAMPLE LI

Using the procedure of Example I, N-(α-chloro-2'-chloro - benzylidene) - 4-chloro-phenylhydrazine was reacted with morpholine to obtain N-(α-morpholino-2'-chloro-benzylidene)-4-chloro-phenylhydrazine melting at 142° C.

As far as is known, this compound is not described in the literature.

EXAMPLE LII

Using the procedure of Example I, N-(α-chloro-3'-trifluoromethyl - benzylidene) - 4-chloro-phenylhydrazine was reacted with morpholine to obtain (N-(α-morpholine-3' - trifluoromethyl benzylidene-4-chloro-phenylhydrazine melting at 100° C.

As far as is known, this compound is not described in the literature.

EXAMPLE LIII

Using the procedure of Example I, N-(α-chloro-4'-methoxy-benzylidene) - 4 - chloro - phenylhydrazine was reacted with morpholine to obtain N-(α-morpholino-4'-methoxy-benzylidene)-4-chloro - phenylhydrazine melting at 112° C.

As far as is known, this compound is not described in the literature.

EXAMPLE LIV

Using the procedure of Example I, N-(α-chloro-4'-chlorobenzylidene) - 2,4,6-trichloro-phenylhydrazine was reacted with morpholine to obtain N-(α-morpholino-4'-chloro-benzylidene) - 2,4,6 - trichloro - phenylhydrazine melting at 107° C.

As far as is known, this compound is not described in the literature.

EXAMPLE LV

Using the procedure of Example I, N-(α-chloro-4'-chlorobenzylidene) - 3 - trifluoromethyl-phenylhydrazine was reacted with morpholine to obtain N-(α-morpholino-4'-chloro-benzylidene) - 3 - trifluoromethyl-phenylhydrazine melting at 133° C.

As far as is known, this compound is not described in the literature.

EXAMPLE LVI

Using the procedure of Example I, N-(α-chloro-2',4'-dichloro-benzylidene) - 2,4 - dichloro-phenylhydrazine was reacted with morpholine to obtain N-(α-morpholino-2',4'-dichloro-benzylidene) - 2,4 - dichloro-phenylhydrazine melting at 165° C.

As far as is known, this compound is not described in the literature.

EXAMPLE LVII

Using the procedure of Example I, N-(α-chloro-benzylidene) - 2,4,6 - trichloro-phenylhydrazine was reacted with morpholine to obtain N-(α-morpholino-benzylidene)-2,4,6-trichloro-phenylhydrazine melting at 84° C.

As far as is known, this compound is not described in the literature.

EXAMPLE LVIII

Using the procedure of Example I, N-(α-chloro-benzylidene) - phenylhydrazine was reacted with diisopropylamine to obtain N-(α-diisopropylamino-benzylidene)-2-phenylhydrazine melting at 64° C.

As far as is known, this compound is not described in the literature.

EXAMPLE LIX

Using the procedure of Example I, N-(α-chloro-4'-chlorobenzylidene) - 3 - trifluoromethyl-phenylhydrazine was reacted with diisopropylamine to obtain N-(α-diisopropylamino - 4' - chloro-benzylidene)-3-trifluoromethyl-phenylhydrazine melting at 61° C.

As far as is known, this compound is not described in the literature.

EXAMPLE LX

Using the procedure of Example I, N-(α-chloro-2',4'-dichloro-benzylidene)-4-chlorophenylhydrazine was reacted with diisopropylamine to obtain N-(α-diisopropylamino - 2',4' - dichloro-benzylidene)-4-chloro-phenylhydrazine melting at 130° C.

As far as is known, this compound is not described in the literature.

EXAMPLE LXI

Using the procedure of Example I, N-(α-chloro-benzylidene)-33-trifluoromethyl-phenylhydrazine was reacted with methylamine to obtain N-(α-methylamino-benzylidene)-3-trifluoromethyl-phenylhydrazine melting at 114° C.

As far as is known, this compound is not described in the literature.

EXAMPLE LXII

Using the procedure of Example I, N-(α-chloro-3',4'-dichloro-benzylidene)-phenylhydrazine was reacted with methylamine to obtain N-(α-methylamino-3',4'-dichloro-benzylidene)-phenylhydrazine melting at 104° C.

As far as is known, this compound is not described in the literature.

EXAMPLE LXIII

Using the procedure of Example I, N-(α-chloro-4'-chlorobenzylidene)-4-chloro-phenylhydrazine was reacted with N-methylcyclohexylamine to obtain N-(α-[N-methyl-N-cyclohexylamino] - 4' - chloro - benzylidene)-4-chloro-phenylhydrazine melting at 140° C.

As far as is known, this compound is not described in the literature.

EXAMPLE LXIV

Using the procedure of Example I, N-(α-chloro-4'-chlorobenzylidene) - 4 - chloro - phenylhydrazine was reacted with benzylamine to obtain N-(α-benzylamino-4'-chloro-benzylidene)-4-chloro-phenylhydrazine melting at 156° C.

As far as is known, this compound is not described in the literature.

EXAMPLE LXV

Using the procedure of Example I, N-(α-chloro-benzylidene)-4-chloro-phenylhydrazine was reacted with furfurylamine to obtain N-(α - furfurylamino - benzylidene)-4-chloro-phenylhydrazine melting at 69° C.

EXAMPLE LXVI

Using the procedure of Example I, N-(α-chloro-benzylidene)-3-trifluoromethyl - phenylhydrazine was reacted with ammonia to obtain N-(α-amino-benzylidene)-3-trifluoromethyl-phenylhydrazine melting at 68° C.

As far the is known, this compound is not described in the literature.

EXAMPLE LXVII

Using the procedure of Example I, N-(α-chloro-3'-chloro-4'-methoxy - benzylidene)-phenylhydrazine was reacted with methylamine to obtain N-(α-methylamino-3'-chloro-4'-methoxy-benzylidene) - phenylhydraxine melting at 130° C.

As far as is known, this compound is not described in the literature.

EXAMPLE LXVIII

Using the procedure of Example I, N-(α-chloro-benzylidene)-2,4,6 - trichloro-phenylhydrazine was reacted with diisopropylamine to obtain N-(α-diisopropylamino-benzylidene)-2,4,6-trichloro-phenylhydrazine melting at 68° C.

As far as is known, this compound is not described in the literature.

EXAMPLE LXIX

Using the procedure of Example I, N-(α-chloro-benzylidene)-4-chloro - phenylhydrazine was reacted with di-secondarybutylamine to obtain N-(α - disecondarybutylamino-benzylidene)-4-chloro-phenylhydrazine melting at 68° C.

As far as is known, this compound is not described in the literature.

EXAMPLE LXX

Using the procedure of Example I, N-(α-chloro-4'-methoxy-benzylidene)-4-chloro-phenylhydrazine was reacted with methylamine to obtain N-(α-methylamino 4'-methoxy-benzylidene)-4-chloro-phenylhydrazine melting at 42° C. (solvated with 1 mol of methanol).

As far as is known, this compound is not described in the literature.

EXAMPLE LXXI

Using the procedure of Example I, N-(α-chloro-2'-chlorobenzylidene) - 3 - trifluoromethyl-phenylhydrazine was reacted with morpholine to obtain N-(α-morpholino-2'-chloro-benzylidene)-3-trifluoromethyl-phenylhydrazine melting at 122° C.

As far as is known, this compound is not described in the literature.

EXAMPLE LXXII

Using the procedure of Example I, N-(α-chloro-3'-trifluoromethyl-benzylidene) - 3 - trifluoromethyl phenylhydrazine was reacted with morpholine to obtain N-(α-morpholino-3'-trifluoromethyl-benzylidene)-3 - trifluoromethyl-phenylhydrazine melting at 105–106° C.

As far as is known, this compound is not described in the literature.

Fungicidal activity against *Erysiphe polygoni*

The cotyledonous leaves of cucumber treated with the test compounds were contaminated with pellets of filter paper by spores of *Erysiphe polygoni*. The concentrations used ranged from 4000 to 125 p.p.m. of the active material.

The treatments were effected by spraying the cucumber cotyledonous leaves in pots. The distribution was 1 ml. per surface of the pot which were 11 cm. in diameter. The spore suspension was realized in sterile water and was adjusted to about 100,000 conidiums per ml. Three pots of 4 to 5 plants were used for each concentration and after storage for 12 days at 20° C., the degree of attack was noted. This permitted the expression of the activity of the studied products and the results were expressed as the percent of efficacy in Table I.

TABLE I

| Compound | Dose in p.p.m. | | | | | | | | |
|---|---|---|---|---|---|---|---|---|---|
| | 4,000 | 3,000 | 2,000 | 1,500 | 1,000 | 750 | 500 | 250 | 125 |
| N-(α-diisopropylamino-4'-chloro-benzylidene)-4-chloro-phenylhydrazine, percent | | 100 | 93 | | | | 63 | 9 | 0 |
| N-(α-diethylamino-4'-chloro-benzylidene)-4-chloro-phenylhydrazine, percent | | | 56 | | 0 | | | | |
| N-(α-dimethylamino-4'-chloro-benzylidene)-4-chloro-phenylhydrazine, percent | 100 | | 91 | | 20 | | 0 | | |
| N-(α-dimethylamino-2',4'-dichloro-benzylidene)-4-chloro-phenylhydrazine, percent | | 100 | 86 | | 47 | | 0 | | |
| N-(α-dimethylamino-benzylidene)-2,4,6-trichloro-phenylhydrazine, percent | 93 | | 50 | | 0 | | | | |
| N-(α-morpholino-benzylidene)-4-chloro-phenylhydrazine, percent | | 100 | | | 90 | | 0 | | |
| N-(α-piperidinyl-benzylidene)-4-chloro-phenylhydrazine, percent | | 100 | | | 0 | | | | |
| N-(α-dimethylamino-3',4'-dichloro-benzylidene)-4-chloro-phenylhydrazine, percent | | 100 | 82 | | 29 | | 0 | | |
| N-(α-dimethylamino-4'-methoxy-benzylidene)-4-chloro-phenylhydrazine, percent | | 100 | | | 73 | | 0 | | |

The results of Table I show that the compounds tested possess an interesting fungicidal activity against *Erysiphe polygoni*.

Fungicidal activity against *Fusarium roseum*

The fungicidal activity was determined by studying the development of fungi issuing from spores in agar nutritive medium with addition of the studied compound. A suspension of the studied compound in sterile water was enclosed in a nutritive agar media (acidified malt) at the rate of 5 ml. of suspension per 45 ml. of media. The active material concentrations ranged from 100–10–1 p.p.m. The mixture was divided under sterile conditions into two Petri dishes. After solidification, 4 cellulose pellets enriched with a drop of a suspension of Fusarium roseum spores (200,000 spores per ml. of sterile water) were placed at 4 points in the Petri dish. The results were determined on the 7th day by measuring 8 colonies taken from the 2 dishes. The average diameter of the colonies in relation to that of untreated contaiminated controls served as the criteria and the results of Table II are expressed in percent of efficacy.

TABLE II

| Compound | Concentration in p.p.m. | | |
|---|---|---|---|
| | 100 | 10 | 1 |
| N-(α-aminobenzylidene)-4-chloro-phenylhydrazine, percent | 100 | 80 | 40 |
| N-(α-methylaminobenzylidene)-4-chloro-phenylhydrazine, percent | 100 | 80 | 80 |
| N-(α-furfurylaminobenzylidene)-4-chloro-phenylhydrazine, percent | 90 | 40 | 40 |
| N-(α-dimethylaminobenzylidene)-4-chloro-phenylhydrazine, percent | 95 | 40 | 0 |
| N-(α-diisopropylamino-benzylidene)-4-chloro-phenylhydrazine, percent | 100 | 80 | 0 |
| N-(α-piperidinyl-benzylidene)-4-chloro-phenylhydrazine, percent | 100 | 80 | 20 |
| N-(α-morpholinyl-benzylidene)-4-chloro-phenylhydrazine, percent | 100 | 90 | 20 |
| N-(α-methylamino-4'-chloro-benzylidene)-4-chloro-phenylhydrazine, percent | 100 | 100 | 90 |
| N-(α-furfurylamino-4'-chloro-benzylidene)-4-chloro-phenylhydrazine, percent | 20 | 20 | 0 |
| N-(α-dimethylamino-4'-chloro-benzylidene)-4-chloro-phenylhydrazine, percent | 100 | 90 | 60 |
| N-(α-piperidinyl-4'-chloro-benzylidene)-4-chloro-phenylhydrazine, percent | 80 | 0 | 0 |
| N-(α-morpholino-4'-chlorobenzylidene)-4-chloro-phenylhydrazine, percent | 80 | 0 | 0 |
| N-(α-dimethylamino-3',4,'-dichloro-benzylidene)-phenylhydrazine, percent | 100 | 40 | 20 |
| N-(α-dimethylamino-3'-chloro-4'-methoxy-benzylidene)-phenylhydrazine, percent | 100 | 60 | 40 |
| N-(α-dimethylamino-3',4',5'-trimethoxy-benzylidene)-4-chloro-phenylhydrazine, percent | 100 | 80 | 20 |
| N-(α-morpholinyl-2',4'-dichloro-benzylidene)phenylhydrazine, percent | 100 | 60 | 0 |
| N-(α-morpholinyl-2'-chlorobenzylidene)-4-chloro-phenylhydrazine, percent | 100 | 90 | 0 |
| N-(α-morpholinyl-4'-methoxy-benzylidene)-4-chlorophenylhydrazine, percent | 90 | 60 | 0 |

The results of Table II show that the compounds tested have an interesting fungicidal activity against *Fusarium roseum*.

Various modifications of the compounds and processes of the invention may be made without departing from the spirit or scope thereof and it should be understood that the invention is to be limited only as defined in the appended claims.

We claim:

1. A phenylhydrazine of the formula

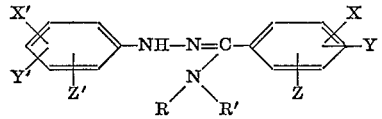

wherein X and Y are selected from the group consisting of hydrogen, chlorine, bromine, lower alkoxy, lower alkyl, $NO_2$ and $CF_3$, Z is selected from the group consisting of hydrogen, chlorine, bromine, lower alkoxy, lower alkyl and $NO_2$, X' is selected from the group consisting of hydrogen, chlorine, bromine, benzyloxy, $NO_2$, SCN, $CF_3$, lower alkyl and lower alkoxy, Y' is selected from the group consisting of hydrogen, chlorine, bromine, —$NO_2$, $CF_3$ and lower alkyl, Z' is selected from the group consisting of hydrogen, chlorine, bromine and lower alkyl, R and R' may be different and are selected from the group consisting of hydrogen, lower alkyl, benzyl, cycloalkyl of 3 to 8 carbon atoms, furfuryl and phenyl optionally substituted with a member of the group consisting of chlorine, bromine and lower alkoxy and taken together with the nitrogen atom to which they are attached form a 5 to 7 ring member heterocyclic selected from the group consisting of morpholino, piperidino, N-methylpiperazinyl, and α-piperidyl with the proviso that at least one of X, Y, Z, R, $R_1$, X', Y' and Z' is other than hydrogen.

2. A compound of claim 1 wherein X and X' are chlorine, Y, Y', Z and Z' are selected from the group consisting of chlorine and hydrogen, R is selected from the group consisting of hydrogen, lower alkyl and cycloalkyl of 3 to 8 carbon atoms and $R_1$ is selected from the group consisting of lower alkyl and cycloalkyl of 3 to 8 carbon atoms.

3. A compound of claim 2 which is N-(α-[N-methyl-N-cyclohexylamino] - 4' - chloro - benzylidene) - 4 - chlorophenylhydrazine.

4. A compound of claim 2 which is N-(α-dimethylamino - 2',4' - dichloro - benzylidene) - 4 - chloro-phenylhydrazine.

5. A compound of claim 2 which is N-(α-methylamino-4'-chloro-benzylidene)-4-chloro-phenylhydrazine.

6. A compound of claim 1 wherein X, X', Y and Y' are selected from the group consisting of hydrogen, chlorine and trifluoromethyl, Z and Z' are selected from the group consisting of hydrogen and chlorine and R and $R_1$ are selected from the group consisting of hydrogen, lower alkyl and cycloalkyl of 3 to 8 carbon atoms with the proviso that at least one of X, Y, Z, R, $R_1$, X', Y' and Z' is other than hydrogen.

7. A compound of claim 1 wherein X, Y and Z are selected from the group consisting of hydrogen, chlorine, lower alkyl, lower alkoxy and nitro, X' is selected from the group consisting of hydrogen, chlorine, benzyloxy, nitro, thiocyanato, lower alkyl and lower alkoxy, Y' is selected from the group consisting of hydrogen, chlorine, nitro and lower alkyl, Z' is selected from the group consisting of hydrogen, chlorine and lower alkyl and R and $R_1$ are selected from the group consisting of hydrogen, lower alkyl, cycloalkyl of 3 to 8 carbon atoms, benzyl, furfuryl and phenyl optionally substituted with a member of the group consisting of chlorine and lower alkoxy with the proviso that at least one of X, Y, Z, R, $R_1$, X', Y' and Z' is other than hydrogen.

8. A compound of claim 1 wherein X and Y are selected from the group consisting of hydrogen, chlorine, lower alkoxy and trifluoromethyl, Z, Y' and Z' are selected from the group consisting of hydrogen and chlorine, X' is selected from the group consisting of hydrogen, chlorine and trifluoromethyl and R and $R_1$ together with the nitrogen atom to which they are attached form a 5 to 7 member heterocyclic selected from the group consisting of morpholino, piperidino, N-methylpiperazinyl and, α-piperidyl.

References Cited

UNITED STATES PATENTS 3,210,422  10/1965  Holsten et al. ____ 260—564 R X

OTHER REFERENCES

Smith: "Open Chain Nitrogen Compounds," vol. 1, pp. 172–73 (1965).

BERNARD HELFIN, Primary Examiner

G. A. SCHWARTZ, Assistant Examiner

U.S. Cl. X.R.

260—454, 347.7, 247.5 R, 294.7 H, 293 D, 268 R, 566 D; 424—326, 302, 285, 248, 267, 250